US008882064B2

(12) United States Patent
Gregg, Jr. et al.

(10) Patent No.: US 8,882,064 B2
(45) Date of Patent: Nov. 11, 2014

(54) COLLAPSIBLE STAND ASSEMBLY

(71) Applicants: James C. Gregg, Jr., Florence, SC (US); Larry L. Lyerly, Florence, SC (US); Joseph C. Lyerly, Florence, SC (US)

(72) Inventors: James C. Gregg, Jr., Florence, SC (US); Larry L. Lyerly, Florence, SC (US); Joseph C. Lyerly, Florence, SC (US)

(*) Notice: Subject to any disclaimer, the term of this patent is extended or adjusted under 35 U.S.C. 154(b) by 0 days.

(21) Appl. No.: 13/756,950

(22) Filed: Feb. 1, 2013

(65) Prior Publication Data
US 2014/0217249 A1   Aug. 7, 2014

(51) Int. Cl.
*F16M 11/20* (2006.01)
*F16M 11/00* (2006.01)
*A47G 23/02* (2006.01)
*F16M 11/24* (2006.01)
*F16M 11/38* (2006.01)
*A47B 3/02* (2006.01)

(52) U.S. Cl.
CPC ............... *F16M 11/00* (2013.01); *F16M 11/20* (2013.01)
USPC ........... 248/164; 248/150; 248/165; 248/166; 248/188.6; 108/118

(58) Field of Classification Search
CPC ....... F16M 11/10; F16M 11/38; F16M 11/00; F16M 11/20; F16M 13/00; A47G 1/142; A47C 9/105; A47C 4/04; A47C 17/72; A47B 3/02; A47B 13/02; A47B 97/08; A47B 13/06; B65F 220/106; G09F 15/0062
USPC ............... 248/150, 164–166, 188.6; 108/115, 108/118–120, 125, 126
See application file for complete search history.

(56) References Cited

U.S. PATENT DOCUMENTS

| 244,215 | A | | 7/1881 | Fenby |
| 283,119 | A | | 8/1883 | Knapp |
| 2,722,972 | A | | 11/1955 | Altruda |
| 3,635,520 | A | | 1/1972 | Roher |
| 4,036,382 | A | | 7/1977 | Perry |
| D251,299 | S | | 3/1979 | Neel |
| 4,281,520 | A | | 8/1981 | Norwood |
| 4,384,379 | A | * | 5/1983 | Yamada ............................ 5/115 |
| 4,579,066 | A | | 4/1986 | Zeigler |
| 4,673,537 | A | | 6/1987 | Goettl |
| D299,268 | S | | 1/1989 | Peltier |
| 4,834,250 | A | | 5/1989 | Dumbeck |
| 4,873,841 | A | | 10/1989 | Bradshaw |
| 4,888,156 | A | | 12/1989 | Johnson |
| 4,913,713 | A | | 4/1990 | Bender |

(Continued)

*Primary Examiner* — Jonathan Liu
*Assistant Examiner* — Taylor Morris
(74) *Attorney, Agent, or Firm* — Nelson Mullins Riley & Scarborough LLP

(57) ABSTRACT

The present invention relates to a collapsible stand assembly. The stand includes four sets of strut members wherein each set of struts are rotationally connected at a midpoint and the lower ends of the strut members are rotationally connected to feet and the upper ends of the strut members are rotationally connected to brackets. A cross support member is rotationally connected at a first end of each bracket such that the second end of the cross support member can be secured to the other bracket on the same side of the stand at different locations to provide different widths and heights of the stand. Two sets of struts on opposite sides of the stand extend above the cross support members to create a stop to prevent structures supported by the stand, such as a cooler, from sliding off the stand when erected.

13 Claims, 11 Drawing Sheets

(56) References Cited

U.S. PATENT DOCUMENTS

| | | |
|---|---|---|
| D315,260 S | 3/1991 | Kelley |
| 5,048,723 A | 9/1991 | Seymour |
| 5,269,157 A | 12/1993 | Ciminelli |
| 5,295,365 A | 3/1994 | Redford |
| 5,370,245 A | 12/1994 | Tersch |
| 5,447,256 A | 9/1995 | Graham |
| 5,553,751 A | 9/1996 | Mowers |
| 5,555,576 A * | 9/1996 | Kim ................................ 5/114 |
| 6,016,784 A | 1/2000 | Tanaka |
| 6,073,460 A | 6/2000 | Credle, Jr. |
| 6,073,894 A | 6/2000 | Chen |
| 6,093,350 A | 7/2000 | Sadinski |
| 6,098,844 A | 8/2000 | Nicolle |
| 6,113,374 A | 9/2000 | Brackman |
| 6,116,882 A | 9/2000 | Sadinski |
| 6,158,361 A | 12/2000 | Zheng |
| 6,276,548 B1 | 8/2001 | Mitchell |
| D448,625 S | 10/2001 | Moffett, III |
| 6,309,034 B1 | 10/2001 | Credle, Jr. |
| 6,322,138 B1 * | 11/2001 | Tang ................................ 297/45 |
| D452,414 S | 12/2001 | Miller |
| 6,378,719 B1 | 4/2002 | Kaiser |
| D460,291 S | 7/2002 | Miller |
| 6,474,244 B1 | 11/2002 | Karpinski |
| 6,517,036 B1 | 2/2003 | Ramirez, Jr. |
| 6,536,733 B1 | 3/2003 | Sharp |
| 6,612,123 B2 | 9/2003 | Miller |
| D482,576 S | 11/2003 | Baylis |
| D484,003 S | 12/2003 | Bozych |
| 6,814,333 B1 | 11/2004 | Freiburger |
| 6,920,995 B2 | 7/2005 | Bowen |
| 7,055,834 B1 | 6/2006 | White |
| 7,147,773 B2 | 12/2006 | Mitchell |
| D568,066 S | 5/2008 | Cohen |
| D568,067 S | 5/2008 | Cohen |
| D568,636 S | 5/2008 | Cohen |
| D569,131 S | 5/2008 | Cohen |
| 8,087,678 B2 | 1/2012 | Nowak |
| 8,181,811 B1 | 5/2012 | Blake |
| 8,215,125 B2 | 7/2012 | Linder |

\* cited by examiner

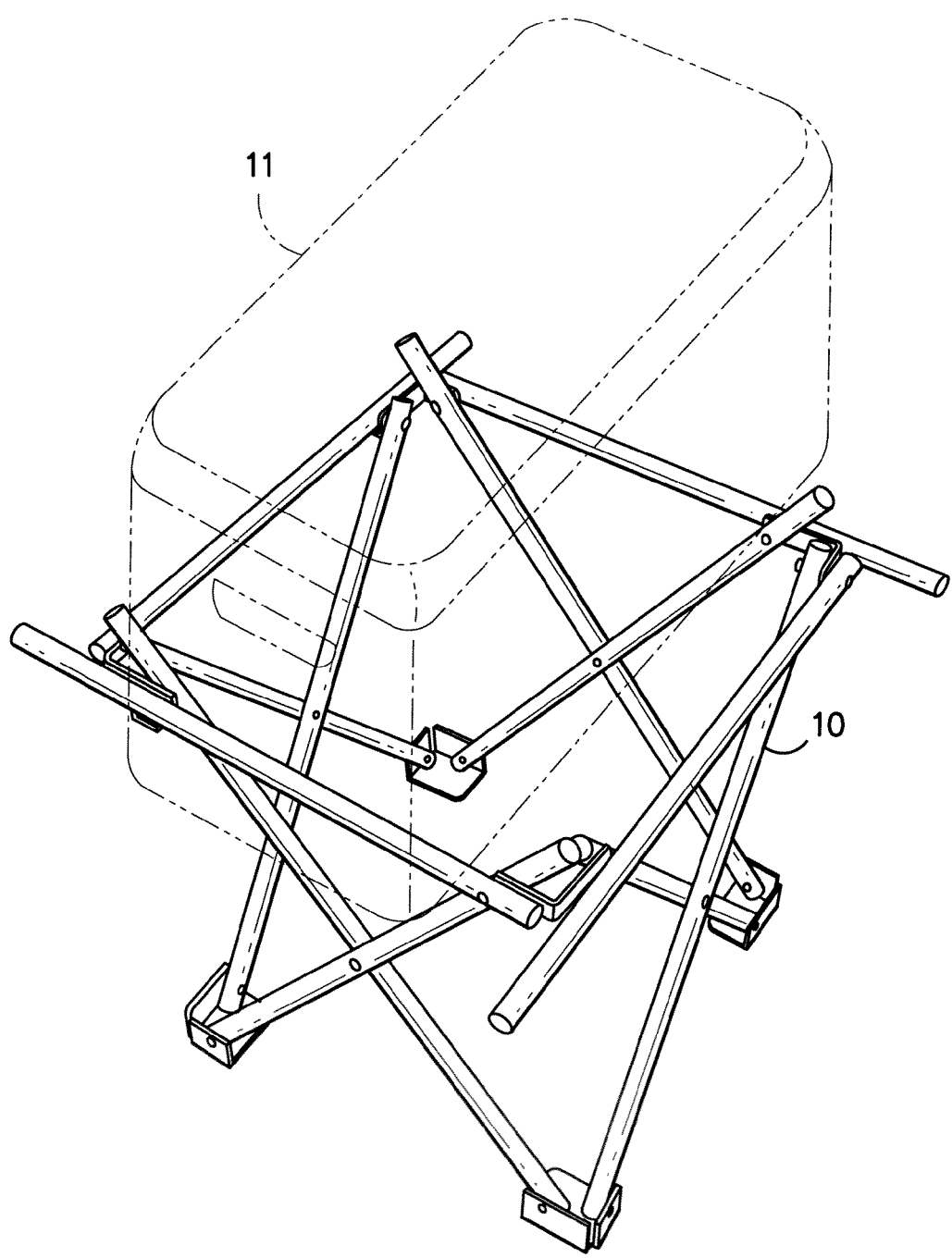
FIG. -1-

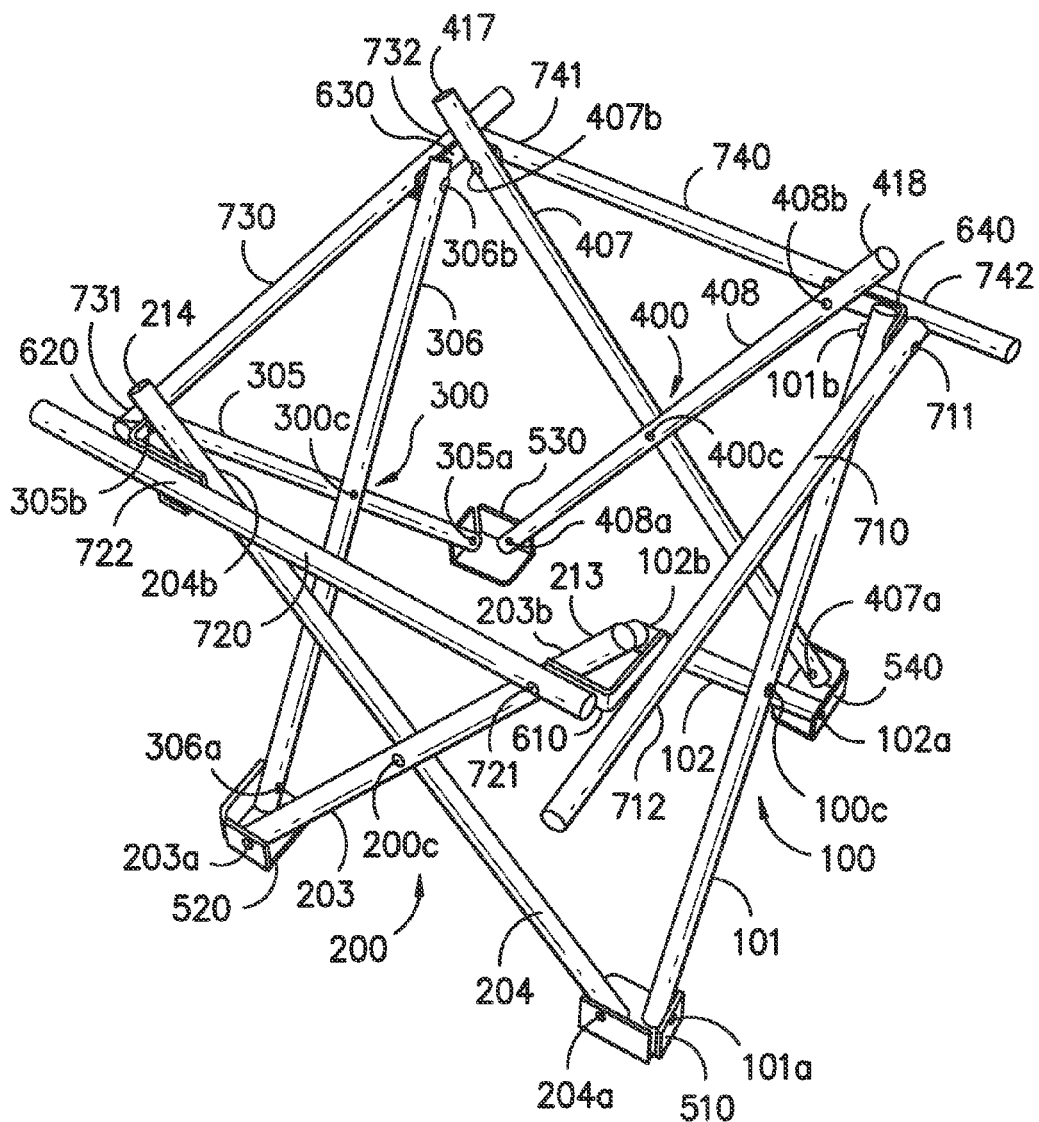
FIG. -2-

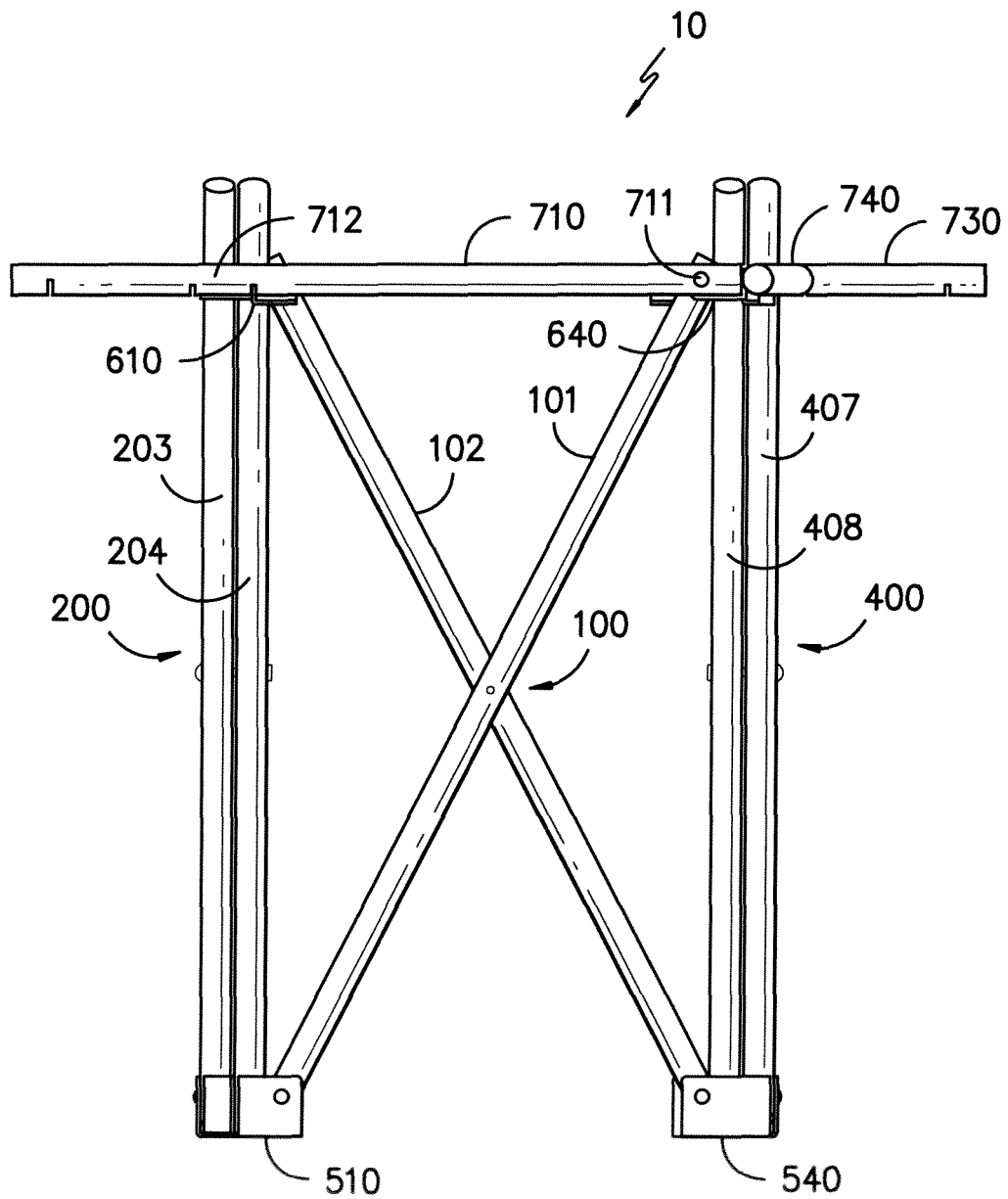
FIG. -3-
(FRONT VIEW)

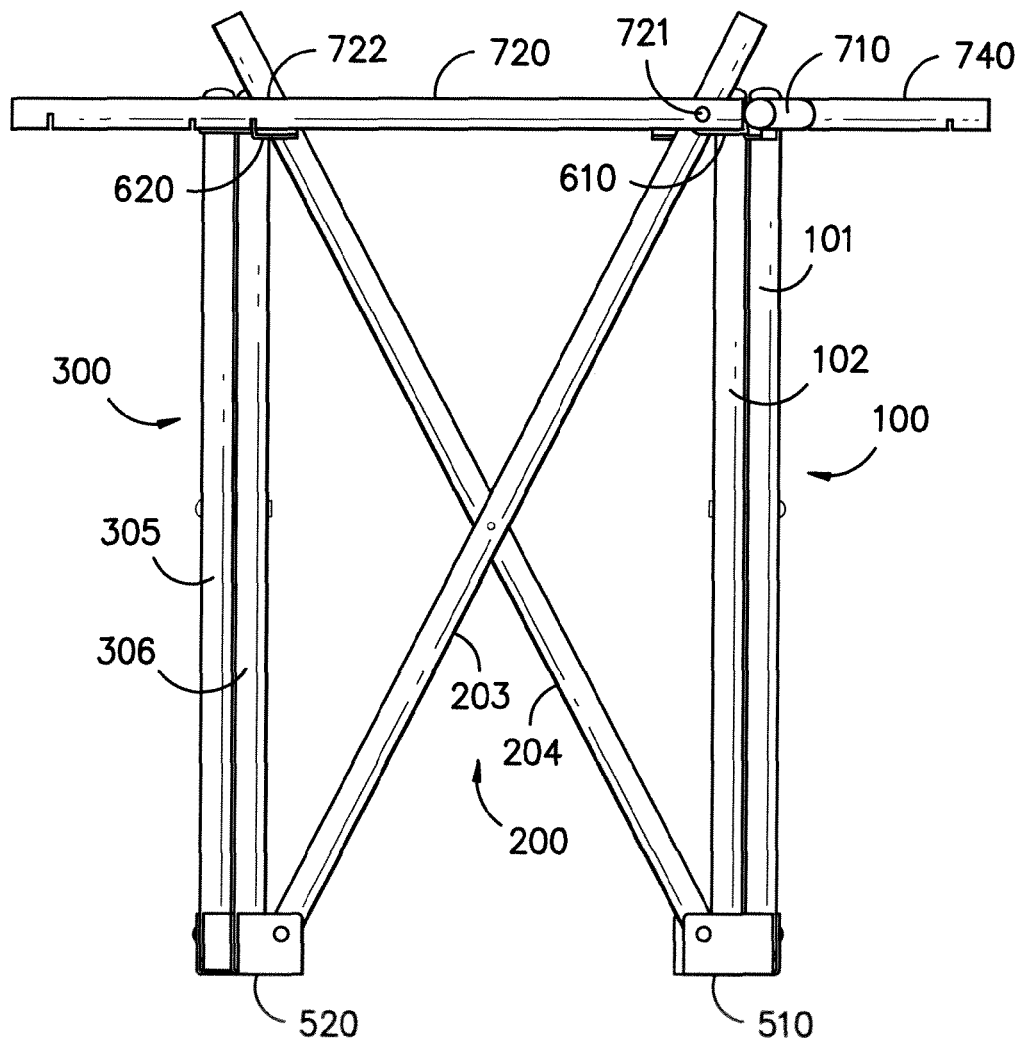
FIG. -4-
(SIDE VIEW)

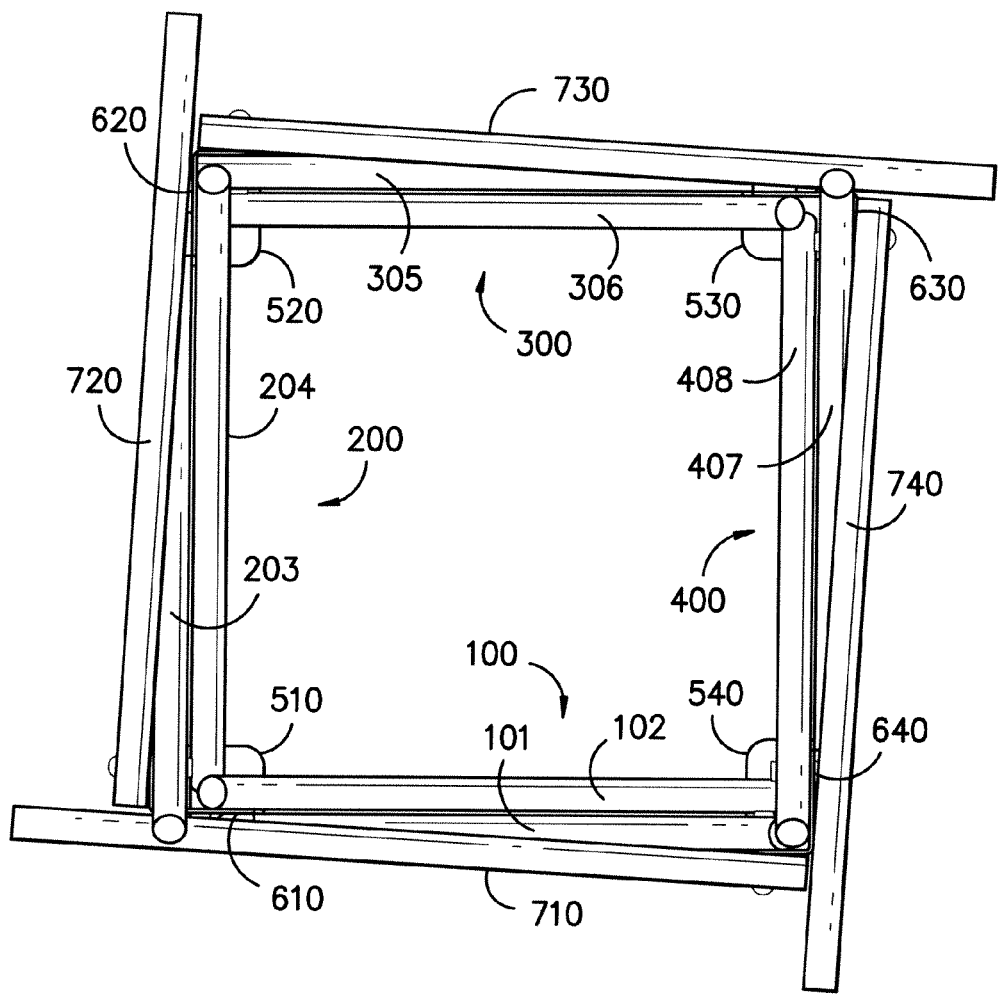
FIG. -5-
(TOP VIEW)

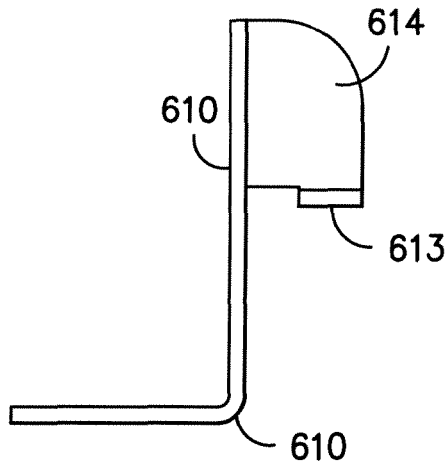
FIG. -6A-
(TOP VIEW)
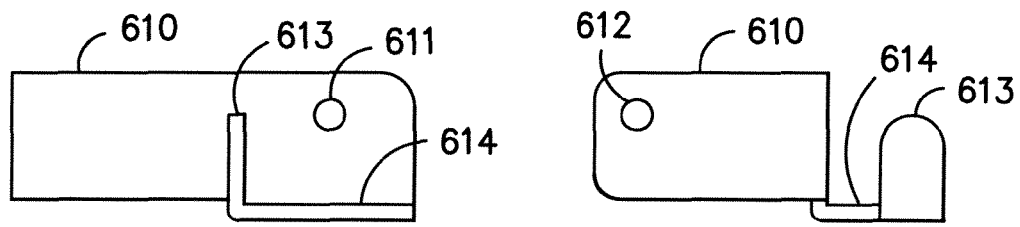
FIG. -6B-
(FRONT VIEW)
FIG. -6C-
(SIDE VIEW)

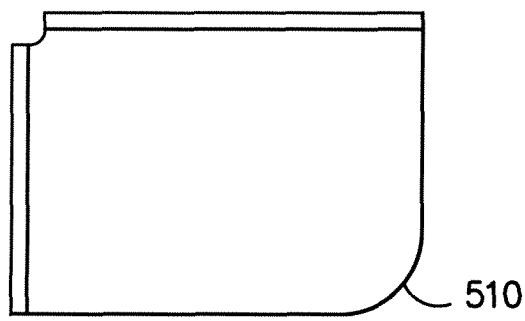
FIG. -7A-
(TOP VIEW)
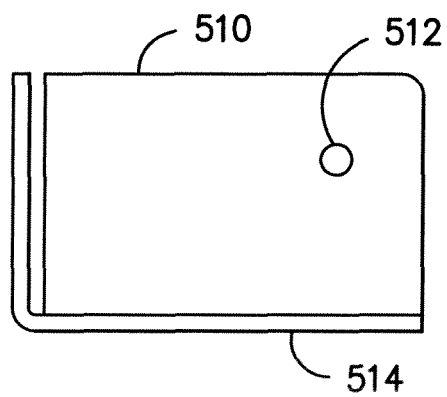
FIG. -7B-
(SIDE VIEW)
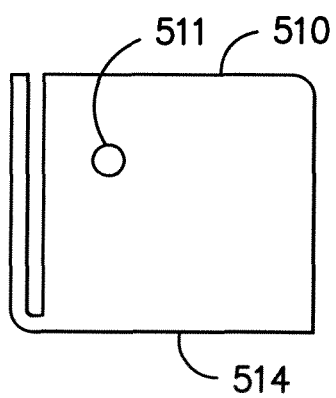
FIG. -7C-
(FRONT VIEW)

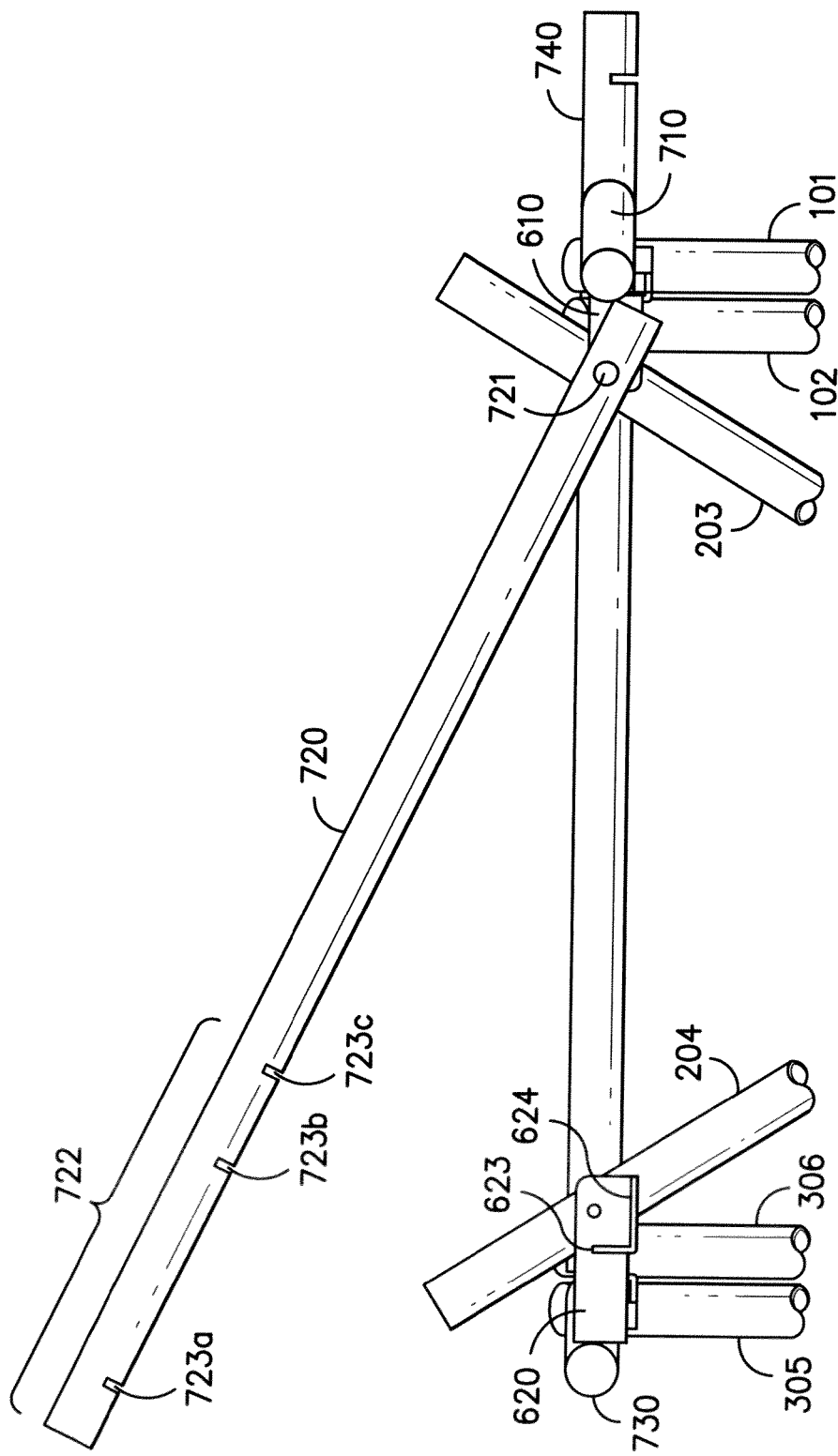
FIG. -8-

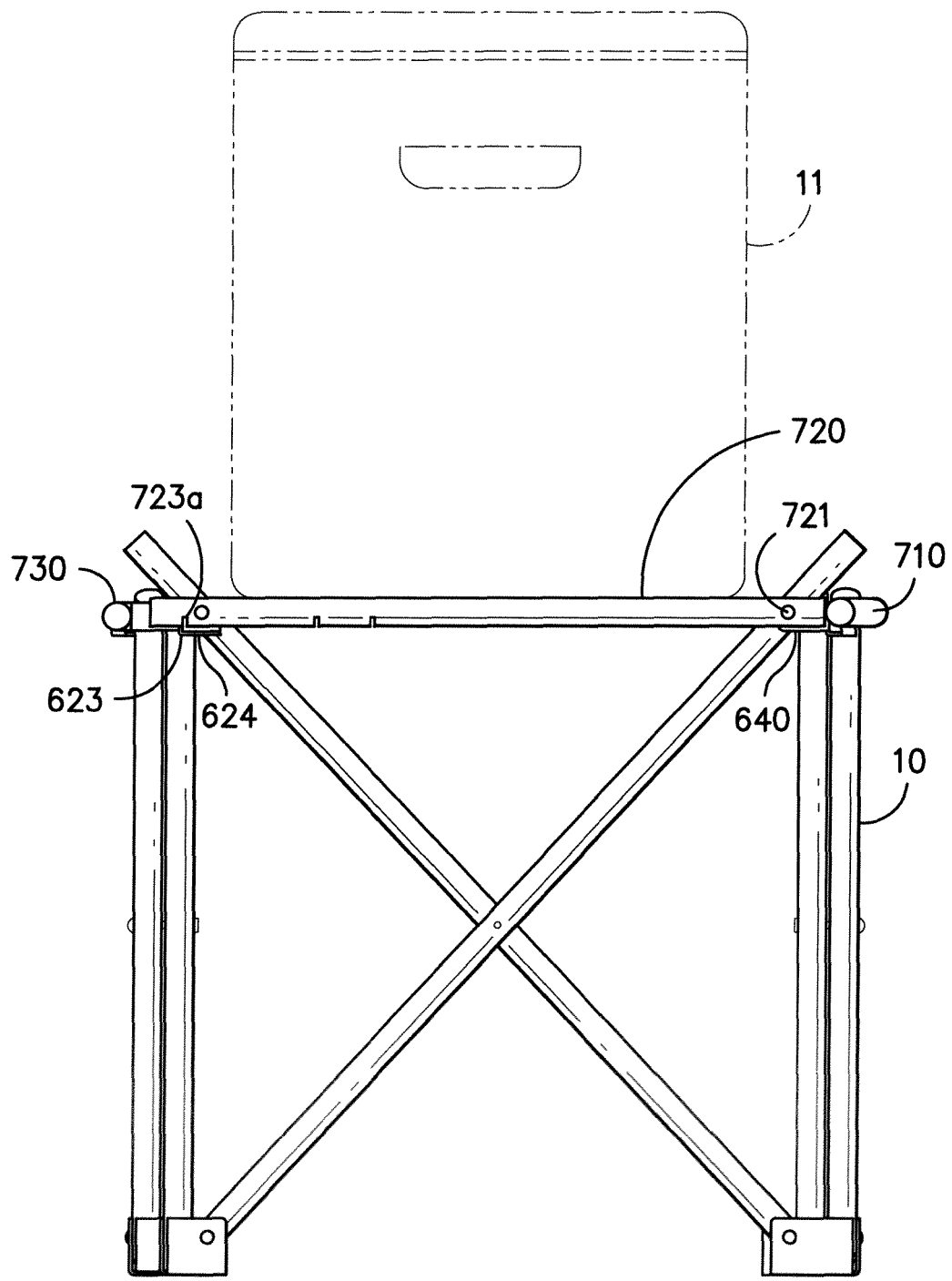
FIG. —9—

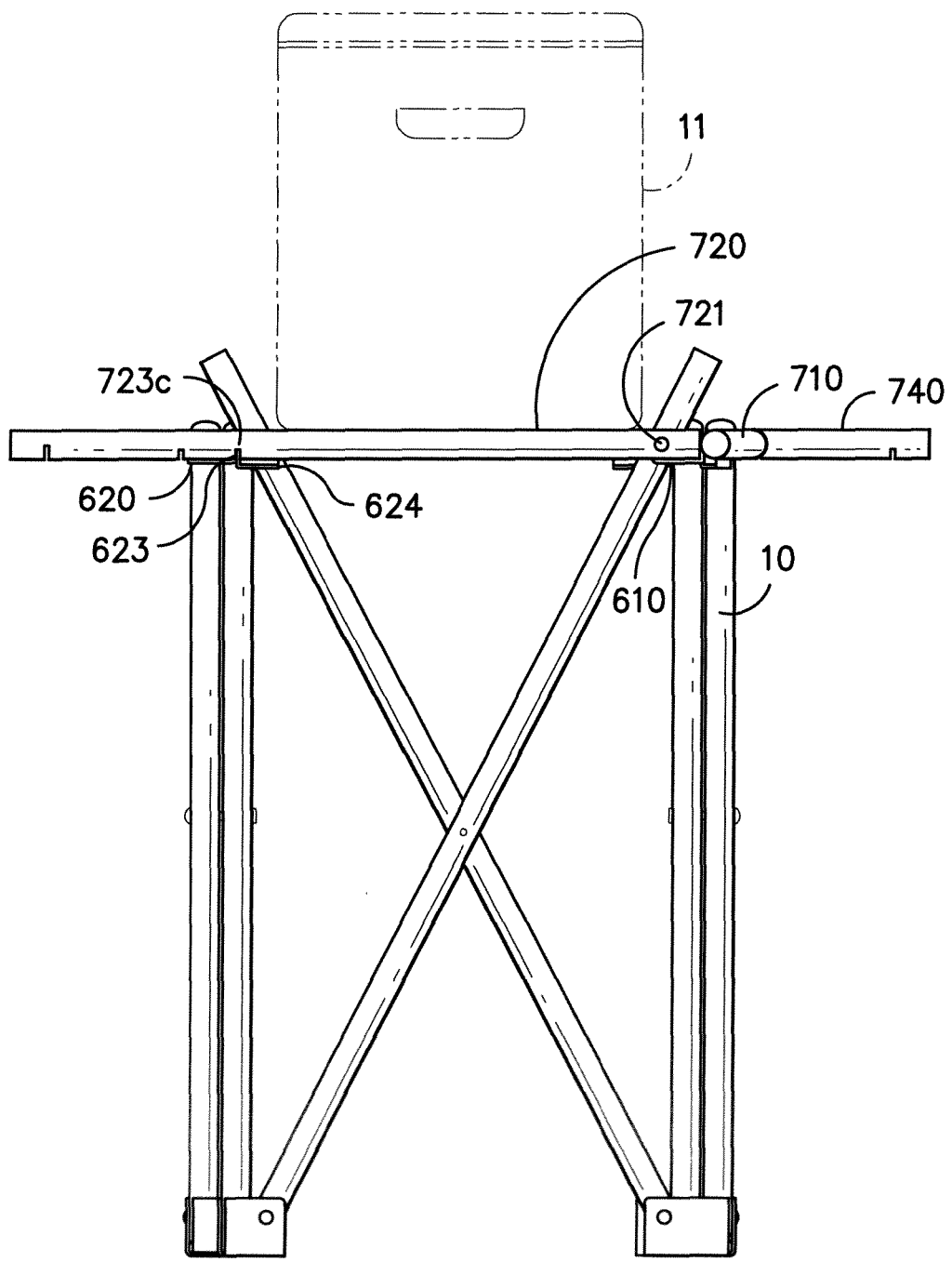
FIG. -10-

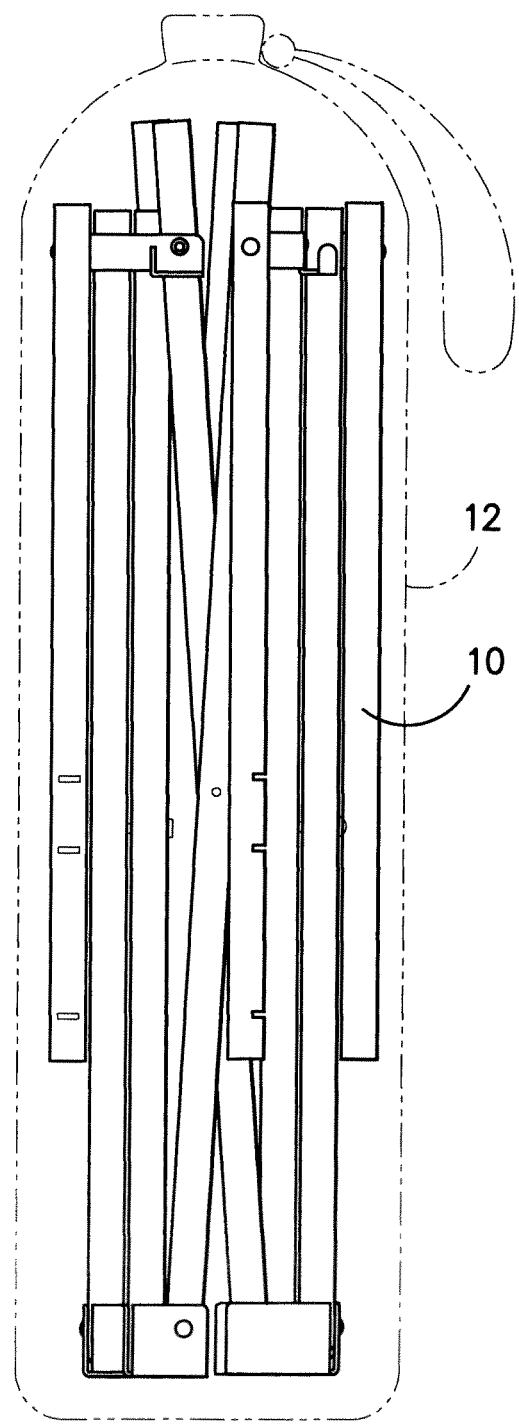
FIG. −11−

COLLAPSIBLE STAND ASSEMBLY

FIELD OF THE INVENTION

The present invention relates generally to stands and more particularly to collapsible stands that may be used to support coolers of varying sizes.

BACKGROUND OF THE INVENTION

Stands that are collapsible for transportation and storage have unique challenges to provide a stable platform for supporting the items. These challenges are increased when the stand is adjustable for different platform sizes and heights. The present invention provides a stable, collapsible stand that has adjustability. While the stand may be used for supporting various structures, one exemplary structure that the stand may support is a cooler and, particularly, a cooler used at an event for containing drinks or other items to be chilled and dispensed.

SUMMARY OF THE INVENTION

The present invention is a stand with four sets of outer strut members, each set being rotationally connected at a midpoint. The sets of strut members are connected together by brackets and feet, the lower end of a strut member rotationally connected to a foot that is also rotationally connected to the lower end of a strut member from a different set of struts, and the upper ends of the strut members rotationally connected to a bracket that is also rotationally connected to the upper end of a strut member from a different set of struts. The rotational movements of the struts in the first set are in a plane that is parallel to the plane for the rotational movements of the struts in the third set. The rotational movements of the struts in the second set are in a plane that is parallel to the plane for the rotational movements of the struts in the fourth set. The planes of rotation for the first set and the third set of struts are perpendicular to planes of rotation for the second set and the third sets of struts, creating a box like structure. Rotationally connected to each bracket is also a cross support member such that the second end of the cross support member can be secured to the other bracket on the same side of the stand. The second end of the cross members are removably secured to the corresponding bracket, allowing for a secure and stable stand in the secured position. In one aspect of the invention, the means for securing the second end of the cross members to the corresponding bracket includes the ability to secure the bracket to the cross member at different locations on the cross member, allowing for adjustability of the width and height of the stand. In another aspect of the invention, the height of the struts in parallel sets extends above the secured position of the cross members, providing a stop that will prevent items from sliding off of the cross members of the stand.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which:

FIG. 1 is perspective view of a collapsible stand assembly in accordance with an embodiment of the present invention, shown in use with a cooler;

FIG. 2 is a perspective view of the collapsible stand assembly of FIG. 1;

FIG. 3 is a front elevation view of the collapsible stand assembly of FIG. 1, the rear view being substantially similar;

FIG. 4 is a left side view of the collapsible stand assembly of FIG. 1, with the right side view (not shown) being substantially similar;

FIG. 5 is a top plan view of the collapsible stand assembly of FIG. 1;

FIGS. 6A, 6B, and 6C are top, front, and side views, respectively, of the first bracket from collapsible stand assembly of FIG. 1;

FIGS. 7A, 7B, and 7C are top, front, and side views, respectively, of the first foot from collapsible stand assembly of FIG. 1;

FIG. 8 is a partial side elevation view of the collapsible stand assembly of FIG. 1 further illustrating the securing mechanisms of the second cross support member to the first bracket and the second bracket;

FIG. 9 is a side elevation view of the collapsible stand assembly of FIG. 1, illustrating the use of the stand with engagement of the cross support members with the brackets in a first position;

FIG. 10 is a side elevation view of the collapsible stand assembly of FIG. 1, illustrating the use of the stand with engagement of the cross support members with the brackets in a second position; and, FIG. 11 is view of the collapsible stand assembly of FIG. 1 in a collapsed condition for storage within a storage bag.

Repeat use of reference characters in the present specification and drawings is intended to represent same or analogous features or elements of the invention.

DETAILED DESCRIPTION OF PREFERRED EMBODIMENTS

Reference will now be made in detail to certain embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention generally comprises a collapsible stand assembly 10 having a first set of outer side struts 100, a second set of outer side struts 200, a third set of outer side struts 300, a fourth set of outer side struts 400, feet 510, 520, 530, and 540, brackets 610, 620, 630, and 640, and cross support members 710, 720, 730, and 740. The first set of side struts 100 include a first strut 101 and a second strut 102, the second set of side struts 200 include a third strut 203 and a fourth strut 204, the third set of side struts 300 include a fifth strut 305 and a sixth strut 306, and the fourth set of side struts 400 include a seventh strut 407 and an eighth strut 408.

A lower end 101a of the first strut 101 is rotationally connected to the first foot 510, and a lower end 204a of the fourth strut 204 is also rotationally connected to the first foot 510. A lower end 203a of the third strut 203 is rotationally connected to the second foot 520, and a lower end 306a of the sixth strut 306 is also rotationally connected to the second foot 510. A lower end 305a of the fifth strut 305 is rotationally connected to the third foot 530, and a lower end 408a of the eighth strut 408 is also rotationally connected to the third foot 530. A lower end 407a of the seventh strut 407 is rotationally connected to the fourth foot 540, and a lower end 102a of the second strut 102 is also rotationally connected to the fourth foot 540.

An upper end 102b of the second strut 102 is rotationally connected to the first bracket 610, and an upper end 203b of the third strut 203 is rotationally connected to the first bracket 610. An upper end 204b of the fourth strut 204 is rotationally connected to the second bracket 620, and an upper end 305b of the fifth strut 305 is rotationally connected to the second bracket 620. An upper end 306b of the sixth strut 306 is rotationally connected to the third bracket 630, and an upper end 407b of the seventh strut 407 is rotationally connected to the third bracket 630. An upper end 408b of the eighth strut 408 is rotationally connected to the fourth bracket 640, and an upper end 101b of the first strut 101 is rotationally connected to the fourth bracket 640.

The first set of side struts 100, the second set of side struts 200, the third set of side struts 300, and the fourth set of side struts 400 are rotationally connected to each other at midpoints 100c, 200c, 300c, and 400c, respectively. As used herein, the term "midpoint" means a point between the lower end and the upper end of the strut. However, in one embodiment, the midpoints 100c, 200c, 300c, and 400c may be located halfway between the location where the struts of the respective sets connect to the brackets and the feet.

The rotational movement of the first set of side struts 100 with respect to each other, with respect to the feet 510 and 540, and with respect to the brackets 610 and 640, are in planes parallel each other. The rotational movement of the second pair of side struts 200 with respect to each other, with respect to the feet 510 and 520, and with respect the brackets 610 and 620, are in planes parallel each other. The rotational movement of the third set of side struts 300 with respect to each other, with respect to the feet 520 and 530, and with respect to the brackets 620 and 630, are in planes parallel each other. The rotational movement of the fourth set of side struts 400 with respect to each other, with respect to the feet 530 and 540, and with respect to the brackets 630 and 640, are in planes parallel each other.

The rotational movements of the first set of side struts 100 are in a plane parallel to the plane of the rotational movement of the third set of side struts 300b, and the rotational movements of the second set of side struts 200 are in a plane parallel to the plane of rotational movement of the fourth set of side struts 400. The rotational movement of the first set of side struts 100 and the third set of side struts 300 are in planes that are perpendicular to the rotational planes of the second set of side struts 200 and the fourth set of side struts 400.

The distance between the lower end rotational connections to the feet and the upper end rotational connections to the brackets may be substantially the same for the first strut 101, the second strut 102, the third strut 203, the fourth strut 204, the fifth strut 305, the sixth strut 306, the seventh strut 407, and the eighth strut 408. The midpoint rotational connections of first set of side struts 100, the second set of side struts 200, the third set of side struts 300, and the fourth set of side struts 400 may be at substantially the same position between the lower end rotational connections and the upper end rotational connections.

Depending on how the struts are connected to the brackets, a short portion of the upper ends of the struts may extend above their connection points with the brackets. However, in one embodiment, the third strut 203, fourth strut 204, seventh strut 407, and the eighth strut 408 will each include upper extensions 213, 214, 417, and 418, respectively, which extend an amount above the connection points to the brackets 610, 620, 630, and 640. The upper extensions 213, 214, 417, and 418 create a bumper stop for objects and structures resting on the cross support members and prevent them from sliding off of stand 10. In particular, when a cooler is the structure that is supported by the present collapsible stand, the upper extensions 213, 214, 417, and 418 create stops for blocking, or at least reducing, any sliding movement of the cooler surface on the cross support members.

A first end 711 of the first cross support member 710 is rotationally connected to the bracket 640 such that a second end 712 of the cross support member 710 can engage the first bracket 610 and be secured thereto. A first end 721 of the second cross support member 720 is rotationally connected to the first bracket 610 such that a second end 722 of the first cross support member 710 can engage the second bracket 620 and be secured thereto. A first end 731 of the third cross support member 730 is rotationally connected to the second bracket 620 such that a second end 732 of the third cross support member 730 can engage the third bracket 630 and be secured thereto. A first end 741 of the fourth cross support member 740 is rotationally connected to the third bracket 630 such that a second end 742 of the fourth cross support member 740 can engage the fourth bracket 640 and be secured thereto.

When the second ends 712, 722, 732, and 742 of the cross support members 710, 720, 730, and 740 engage and are secured to the corresponding brackets 610, 620, 630, and 640, the stand assembly 10 is locked into a wider use configuration as illustrated in FIG. 1. When the stand 10 is locked in the wider use configuration as illustrated in FIG. 1, the stand 10 can support items such as cooler 11 which will have dimensions appropriate for being maintained supported by the cross support members of stand 10. When the second ends 712, 722, 732, and 742 of the cross support members 710, 720, 730, and 740, are not secured with the corresponding brackets 610, 620, 630, and 640, the stand assembly 10 is free to move into the narrower storage configuration shown in FIG. 11. When the stand 10 is in the narrower storage configuration as illustrated in FIG. 11, the stand 10 can be stored in a storage bag 12 for easy transportation.

Referring now to FIGS. 6A, 6B, and 6C, there is shown an embodiment of the first bracket 610. It will be understood that the description of this embodiment for the first bracket 610 would also apply to the same embodiment of the second bracket 620, third bracket 630 and the fourth bracket 640. As illustrated in FIGS. 6A, 6B, and 6C, the first bracket 610 has a first strut mounting point 611, a second strut mounting point 612, a cross member securing tab 613 and a cross member horizontal surface 614. The first strut mounting point 611 of the first bracket 610 provides the rotational mounting location for the upper end 202b of the second strut 102, and the second strut mounting point 612 of the first bracket 610 provides the rotational mounting location for the upper end 203a of the third strut 203. The cross member securing tab 613 of the bracket 610 provides part of a mechanism for removably securing the first cross support member 710 and the cross member horizontal surface 614 provides a surface for vertical support of the first cross support member 710.

In the illustrated embodiment, the first strut mounting point 611 and the second strut mounting point 612 are located on the inside surfaces of the bracket 610, perpendicular to each other. The distance from the center of the second strut mounting point 612 to the inside surface of the first bracket 610 with the first strut mounting point 611 is spaced to provide clearance of the third strut 203 from the first bracket 610 and from the second strut 102 during rotation of the third strut 203. With the second strut 102 mounted on the inside of the stand 10 from the first strut 101 and the third strut 203 mounted on the outside of the stand 10 from the fourth strut 204, the distance from the center of the first strut mounting point 611 on the first bracket 610 to the inside surface of the first bracket 610 having the second strut mounting point 612 is substantially the same as the distance from the center of the first strut mounting point 611 on the first bracket 610 to the inside surface of the first bracket 610 having the second strut mounting point 612, plus the width of the third strut 203. As previously mentioned, it will be understood that the description of this embodiment for the configuration of the first bracket 610 with stand 10 would also apply to the same embodiment for the second bracket 620, the third bracket 630, and the fourth bracket 640.

Referring now to FIGS. 7A, 7B, and 7C, there is shown an embodiment of the first foot 510. It will be understood that the description of this embodiment for the first foot 510 would also apply to the same embodiment of the second foot 520, the third foot 530 and the fourth foot 540. As illustrated in FIGS. 7A, 7B, and 7C, the first foot 510 has a first strut mounting point 511, a second strut mounting point 512, and a resting pad horizontal surface 514. The first strut mounting point 511 of the first foot 510 provides the rotational mounting location for the lower end 101a of the first strut 100, and the second strut mounting point 512 of the first foot 510 provides the rotational mounting location for the lower end 204a of the fourth strut 204. The resting pad horizontal surface 514 provides a horizontal surface for vertical support of the stand 10.

In the exemplary illustrated embodiment, the first strut mounting point 511 and the second strut mounting point 512 are located on the inside surfaces of the foot 510, perpendicular to each other. The distance from the center of the first strut mounting point 511 to the inside surface of the first foot 510 having the second strut mounting point 512 is spaced to provide clearance of the first strut 101 from the first foot 510 and from the fourth strut 204 during rotation of the first strut 101. In an embodiment, the distance from the center of the first strut mounting point 511 of the first foot 510 to the inside surface of the first foot 510 having the second strut mounting point 512 is substantially the same as the distance from the center of the second strut mounting point 611 of the first bracket 610 to the inside surface of the first bracket 610 with the first strut mounting point 612. With the second strut 102 mounted on the inside of the stand 10 from the first strut 101 and the third strut 203 mounted on the outside of the stand 10 from the fourth strut 204, the distance from the center of the second strut mounting point 512 on the first foot 510 to the inside surface of the first foot 510 having the first strut mounting point 511 is substantially the same as the distance from the center of the first strut mounting point 511 of the first foot 510 to the inside surface of the first foot 510 having the first strut mounting point 512, plus the width of the first strut 101. As previously mentioned, it will be understood that the description of this embodiment for the configuration of the first foot 510 with stand 10 would also apply to the same embodiment for the second foot 520, the third foot 530, and the fourth foot 540.

Referring now to FIG. 8, there is shown a further illustration of an embodiment of second cross support member 720 and the mechanisms for removably securing the second end 722 of the second cross support member 720. It will be understood that the description of this embodiment for the configuration of the securing mechanisms of the second cross support member 720 would also apply to the same preferred embodiment of the first cross support member 710, the third cross support member 730 and the fourth cross support member 740 and the securing mechanisms for those cross support members. As previously mentioned, the first end 721 of the second cross support member 720 is rotationally connected to the first bracket 610. In a preferred embodiment, the axis of the rotational connection to the first bracket 610 is aligned coaxially with the axis of the rotational connection of the upper end 103a of the third strut 103 to the first bracket 610. At the second end 722 of the second cross support member 720 are stop receptors 723a, 723b, and 723c. Each of the stop receptors 723a, 723b, and 723c provide a location for the cross member stop 623 of the second bracket 620. The cross member rest 624 of the second bracket 620 provides the vertical support to the second end 722 of the second cross support member 720.

Although the means for removably securing the second end of the cross support members is illustrated in the drawings with a slot in the cross support members engaging a tab from the brackets, a person of ordinary skill in the art will readily understand that other configurations may also perform removable securing functions for the second ends of the cross support member to the brackets. For example, the tab could be mounted on the second ends of the cross support members which engage apertures in the brackets, the tabs could be replaced with pins that engage apertures, clamps can be mounted on the brackets that engage the cross support members, clamps can be mounted on the cross support members that engage the brackets, or the like. In addition, the various cross support members could all employ the same securing mechanisms or they could be different amongst all or less than all of the cross support members. The function of the means for removably securing the cross support members is to secure the second end of the cross support member at a single location to the bracket.

As illustrated in FIG. 8, the second cross support member 720 is raised and not secured to the second bracket 620. When the second cross support member 720 is lowered and the stop receptor 723a is engaged with the cross member stop 613 of the first bracket 610, and the other cross support members 710, 730, and 740 are similarly engaged with the corresponding brackets 610, 630, and 640, the stand 10 is secured in a position as illustrated in FIG. 9. The height and width of the stand for supporting objects can be changed by selecting different stop receptors on the cross support members for engaging the cross support members. FIG. 10 illustrates the stand 10 using different stop receptors to increase the width and height of the stand 10 for supporting a different-sized structure, such as a cooler.

In one embodiment, the struts 101, 102, 203, 204, 305, 306, 407, and 408 are formed by tubes, and the rotational connections are created by rivets. The cross support members 710, 720, 730, and 740 can also be formed of tubes, and the rotational connections to the brackets 640, 610, 620, and 630, can be created by the same rivets connecting the struts 101, 203, 305, and 407 to the brackets 640, 610, 620, and 630, respectively. The stop receptors in the cross support members 710, 720, 730, and 740 can be formed by slots in the tubes such that the inner walls of the tube prevent lateral movement of the cross support members 710, 720, 730, and 740 on the cross member stops of the brackets 610, 620, 630, and 640, respectively. Indicia on the top of the cross support members 710, 720, 730, and 740 located above the stop receptors may provide a reference to the potential positions of the cross support members 710, 720, 730, and 740.

The entire collapsible stand structures can be formed from lightweight aluminum tubes and surfaces, but the actual design of the components and their manufacture can be varied, depending on the desired properties. For example, the use of aluminum tubes allows for a readily transportable, lightweight, yet strong, collapsible stand. It will be understood that other materials, including but not limited to steel, graphite, etc., may be utilized. It will father be understood that flat bladed supports and structures other than tubes may also be utilized if desired.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged in whole or in part. Furthermore, those of ordinary skill in the art will appreciate that the foregoing description is by way of example only, and is not intended to limit the invention so further described in such appended claims. Therefore, the spirit and scope of the appended claims should not be limited to the description of the versions contained therein.

What is claimed is:

1. A collapsible stand for supporting a supported item, the stand comprising:
   a frame structure comprising struts, cross members, and brackets wherein each of the struts and cross members are secured at one of their ends to a bracket and wherein the frame structure comprises:
      a first set of outer struts comprising:
         a first strut having a first strut lower end, a first strut upper end, and a first strut midpoint;
         a second strut having a second strut lower end, a second strut upper end, and a second strut midpoint rotationally connected with the first strut midpoint of the first strut;
      a second set of outer struts comprising:
         a third strut having a third strut lower end, a third strut upper end, and a third strut midpoint;
         a fourth strut having a fourth strut lower end, a fourth strut upper end, and a fourth strut midpoint rotationally connected with the third strut midpoint of the third strut;
      a third set of outer struts comprising:
         a fifth strut having a fifth strut lower end, a fifth strut upper end, and a fifth strut midpoint;
         a sixth strut having a sixth strut lower end, a sixth strut upper end, and a sixth strut midpoint rotationally connected with the fifth strut midpoint of the fifth strut;
      a fourth set of outer struts comprising:
         a seventh strut having a seventh strut lower end, a seventh strut upper end, and a seventh strut midpoint;
         an eighth strut having an eighth strut lower end, an eighth strut upper end, and an eighth strut midpoint rotationally connected with the seventh strut midpoint of the seventh strut;
      a set of feet, comprising:
         a first foot rotationally connected with the first strut lower end and rotationally connected with the fourth strut lower end;
         a second foot rotationally connected with the third strut lower end and rotationally connected with the sixth strut lower end;
         a third foot rotationally connected with the fifth strut lower end and rotationally connected with the eighth strut lower end;
         a fourth foot rotationally connected with the second strut lower end and rotationally connected with the seventh strut lower end;
      a set of brackets, wherein each of the brackets comprises a first bracket position and a second bracket position, wherein the set of brackets comprises:
         a first bracket rotationally connected with the second strut upper end and rotationally connected with the third strut upper end;
         a second bracket rotationally connected with the fourth strut upper end and rotationally connected with the fifth strut upper end;
         a third bracket rotationally connected with the sixth strut upper end and rotationally connected with the seventh strut upper end;
         a fourth bracket rotationally connected with the first strut upper end and rotationally connected with the eighth strut upper end;
      a set of cross support members, comprising:
         a first cross support member having a first cross member first end and a first cross member second end, the first cross member first end rotationally connected with the first bracket position of the fourth bracket and the first cross member second end removably secured to the second bracket position of the first bracket at a position along the length of the first cross member;
         a second cross support member having a second cross member first end and a second cross member second end, the second cross member first end rotationally connected with the first bracket position of the first bracket and the second cross member second end removably secured to the second bracket position of the second bracket at a position along the length of the second cross member;
         a third cross support member having a third cross member first end and a third cross member second end, the third cross member first end rotationally connected with the first bracket position of the second bracket and the third cross member second end removably secured to the second bracket position of the third bracket at a position along the length of the third cross member;
         a fourth cross support member having a fourth cross member first end and a fourth cross member second end, the fourth cross member first end rotationally connected with the first bracket position of the third bracket and the fourth cross member second end removably secured to the second bracket position of the fourth bracket at a position along the length of the fourth cross member;
      wherein the rotational movements of the first strut and the second strut within the first set of outer struts are in a pane parallel to the plane of the rotational movements of the fifth strut and the sixth strut within the third set of outer struts;
      wherein the rotational movements of the third strut and the fourth strut within the second set of outer struts are in a plane parallel to the plane of the rotational movements of the seventh strut and the eighth strut within the fourth set of outer struts; and
      wherein the planes of the rotational movements of the first set of outer struts and the third set of outer struts are perpendicular to the planes of the rotational movements of the second set of outer struts and the fourth set of outer struts.

2. The stand according to claim 1, wherein the length of the first cross member has a plurality of positions at which the first cross member may be removably secured to the second bracket position of the first bracket, wherein the length of the second cross member has a plurality of positions at which the second cross member may be removably secured to the second bracket position of the second bracket, wherein the length of the third cross member has a plurality of positions at which the third cross member may be removably secured to the second bracket position of the third bracket, and wherein the length of the fourth cross member has a plurality of positions at which the fourth cross member may be removably secured to the second bracket position of the fourth bracket.

3. The stand according to claim 1, wherein the first bracket further includes a vertical support for the first cross member second end, the second bracket further includes a vertical support for the second cross member second end, the third bracket further includes a vertical support for the third cross member second end, and the fourth bracket further includes a vertical support for the fourth cross member second end.

4. The stand according to claim 2, wherein:
the first bracket further includes a vertical support for the first cross member second end, the second bracket further includes a vertical support for the second cross member second end, the third bracket further includes a vertical support for the third cross member second end, and the fourth bracket further includes a vertical support for the fourth cross member second end.

5. The stand according to claim 1, wherein the third strut, fourth strut, seventh strut, and eighth strut each include extensions that extend above the set of cross support members.

6. The stand according to claim 1, wherein: the rotational connection of the first bracket to the third strut upper end is on the same axis as the rotational connection of the second cross member first end to the first bracket position of the first bracket; the rotational connection of the second bracket to the fifth strut upper end is on the same axis as the rotational connection of the third cross member first end to the first bracket position of the second bracket; the rotational connection of the third bracket to the seventh strut upper end is on the same axis as the rotational connection of the third cross member first end to the first bracket position of the third bracket and, the rotational connection of the fourth bracket to the first strut upper end is on the same axis as the rotational connection of the first cross member first end to the first bracket position of the fourth bracket.

7. The stand according to claim 6, wherein:
the third strut and the second cross support member are rotatably connected to the first bracket by the same rotational element;
the fifth strut and the third cross support member are rotatably connected to the second bracket by the same rotational element;
the seventh strut and the fourth cross support member are rotatably connected to the third bracket by the same rotational element; and,
the first strut and the first cross support member are rotatably connected to the fourth bracket by the same rotational.

8. The stand according to claim 1, wherein: the second bracket position of the first bracket includes a first bracket tab and the first cross member second end includes a first member slot for engagement with the first bracket tab; the second bracket position of the second bracket includes a second bracket tab and the second cross member second end includes a second member slot for engagement with the second bracket tab; the second bracket position of the third bracket includes a third bracket tab and the third cross member second end includes a third member slot for engagement with the third bracket tab; and the second bracket position of the fourth bracket includes a fourth bracket tab and the fourth cross member second end includes a fourth member slot for engagement with the fourth bracket tab.

9. The stand according to claim 1, the second bracket position of the first bracket includes a first bracket tab and the first cross member second end includes a plurality of first member slots for engagement with the first bracket tab; the second bracket position of the second bracket includes a second bracket tab and the second cross member second end includes a plurality of second members slot for engagement with the second bracket tab; the second bracket position of the third bracket includes a third bracket tab and the third cross member second end includes a plurality of third member slots for engagement with the third bracket tab; and the second bracket position of the fourth bracket includes a fourth bracket tab and the fourth cross member second end includes a plurality of fourth member slots for engagement with the fourth bracket tab.

10. The stand according to claim 9, wherein the plurality of first member slots, second member slots, third member slots and fourth member slots are spaced at substantially equal distances from the rotational connection between the first cross support member and the fourth bracket, the rotational connection between the second cross support member and the first bracket, the rotational connection between the third cross support member and the second bracket, and the rotational connection between the fourth cross support member and the third bracket, respectively.

11. The stand according to claim 1, wherein the first bracket, second bracket, third bracket, and fourth bracket each include a horizontal surface for vertical support of the first cross support member, second cross support member, third cross support member, and fourth cross support member, respectively.

12. The stand according to claim 1, wherein;
the first strut is mounted on the outside of the second strut with respect to the stand, the third strut is mounted on the outside of the fourth strut with respect to the stand, the fifth strut is mounted on the outside of the sixth strut with respect to the stand, and the seventh strut is mounted on the outside of the eighth strut with respect to the stand;
the first bracket includes a first bracket first mounting surface where the outside surface of the first strut with respect to the stand rotatably connects with the first bracket, a first bracket second mounting surface where the outside surface of the fourth strut with respect to the stand rotatably connects with the first bracket, and the distance from the rotatable connection of the fourth strut with the first bracket second mounting surface to the first bracket first mounting surface is greater than the width of the first strut;
the second bracket includes a second bracket first mounting surface where the outside surface of the third strut with respect to the stand rotatably connects with the second bracket, a second bracket second mounting surface where the outside surface of the sixth strut with respect to the stand rotatably connects with the second bracket, and the distance from the rotatable connection of the sixth strut with the second bracket second mounting surface to the second bracket first mounting surface is greater than the width of the third strut;
the third bracket includes a third bracket first mounting surface where the outside surface of the fifth strut with respect to the stand rotatably connects with the third bracket, a third bracket second mounting surface where the outside surface of the eighth strut with respect to the stand rotatably connects with the third bracket, and the distance from the rotatable connection of the eighth strut with the third bracket second mounting surface to the third bracket first mounting surface is greater than the width of the fifth strut; and, the fourth bracket includes a fourth bracket first mounting surface where the outside surface of the seventh strut with respect to the stand rotatably connects with the fourth bracket, a fourth bracket second mounting surface where the outside surface of the second strut with respect to the stand rotatably connects with the fourth bracket, and the distance from the rotatable connection of the second strut with the fourth bracket second mounting surface to the seventh bracket first mounting surface is greater than the width of the seventh strut.

13. The stand according to claim wherein:

the first strut is mounted on the outside of the second strut with respect to the stand, the third strut is mounted on the outside of the fourth strut with respect to the stand, the fifth strut is mounted on the outside of the sixth strut with respect to the stand, and the seventh strut is mounted on the outside of the eighth strut with respect to the stand;

the first foot includes a first foot first mounting surface where the outside surface of the first strut with respect to the stand rotatably connects with the first foot, a first foot second mounting surface where the outside surface of the fourth strut with respect to the stand rotatably connects with the first foot, and the distance from the rotatable connection of the fourth strut with the first foot second mounting surface to the first foot first mounting surface is greater than the width of the first strut;

the second foot includes a second foot first mounting surface where the outside surface of the third strut with respect to the stand rotatably connects with the second foot, a second foot second mounting surface where the outside surface of the sixth strut with respect to the stand rotatably connects with the second foot, and the distance from the rotatable connection of the sixth strut with the second foot second mounting surface to the second foot first mounting surface is greater than the width of the third strut;

the third foot includes a third foot first mounting surface where the outside surface of the fifth strut with respect to the stand rotatably connects with the third foot, a third foot second mounting surface where the outside surface of the eighth strut with respect to the stand rotatably connects with the third foot, and the distance from the rotatable connection of the eighth strut with the third foot second mounting surface to the third foot first mounting surface is greater than the width of the fifth strut; and, the fourth foot includes a fourth foot first mounting surface where the outside surface of the seventh strut with respect to the stand rotatably connects with the fourth foot, a fourth foot second mounting surface where the outside surface of the second strut with respect to the stand rotatably connects with the fourth foot, and the distance from the rotatable connection of the second strut with the fourth foot second mounting surface to the seventh foot first mounting surface is greater than the width of the seventh strut.

* * * * *

UNITED STATES PATENT AND TRADEMARK OFFICE
CERTIFICATE OF CORRECTION

PATENT NO. : 8,882,064 B2  Page 1 of 1
APPLICATION NO. : 13/756950
DATED : November 11, 2014
INVENTOR(S) : James C. Gregg, Jr. et al.

It is certified that error appears in the above-identified patent and that said Letters Patent is hereby corrected as shown below:

In the Claims

Column 8, line 51 (claim 1), replace:

"in a pane parallel to the plane of the rotational"

with:

--in a plane parallel to the place of the rotational--

Signed and Sealed this
Twenty-eighth Day of April, 2015

Michelle K. Lee
*Director of the United States Patent and Trademark Office*